United States Patent [19]

Seike et al.

[11] Patent Number: 5,308,712
[45] Date of Patent: May 3, 1994

[54] AIR ELECTRODE AND SOLID ELECTROLYTE FUEL CELL HAVING THE SAME

[75] Inventors: Shoji Seike; Hirotake Yamada, both of Nagoya, Japan

[73] Assignee: NGK Insulators, Ltd., Japan

[21] Appl. No.: 858,031

[22] Filed: Mar. 26, 1992

[30] Foreign Application Priority Data

Mar. 28, 1991 [JP] Japan ................................ 3-87351

[51] Int. Cl.$^5$ ............................................. H01M 8/10
[52] U.S. Cl. ........................................ 429/30; 429/40
[58] Field of Search ................................ 429/30, 40

[56] References Cited

U.S. PATENT DOCUMENTS

| | | | |
|---|---|---|---|
| 3,804,674 | 4/1974 | Kudo et al. | 429/40 |
| 5,114,803 | 5/1992 | Ishihara et al. | 429/30 |

FOREIGN PATENT DOCUMENTS

| | | |
|---|---|---|
| 0008430 | 3/1980 | European Pat. Off. . |
| 0188868 | 7/1986 | European Pat. Off. . |
| 0426265 | 5/1991 | European Pat. Off. . |
| 0466418 | 1/1992 | European Pat. Off. . |
| 2738756 | 3/1979 | Fed. Rep. of Germany . |
| 3-90877 | 4/1991 | Japan . |
| 67564 | 4/1992 | Japan . |

OTHER PUBLICATIONS

Chemical Abstracts, Abstract No. 250734x, vol. 114, No. 26, Jul. 1, 1991 Columbus, Ohio, "Manufacture of Solid-Electrolyte Fuel Cells", Yamanochi Hiroshi et al.
Chemical Abstracts, Abstract No. 100269y, vol. 111, No. 6, Sep. 18, 1989 Columbus, Ohio, "Ca1-xCexMnO3 as New Air Electrode Materials for SOFC", Iwahara Hiroyasu et al.
Patent Abstracts of Japan, vol. 15, No. 308 (E-1097), Aug. 1991.
Patent Abstracts of Japan, vol. 13, No. 548 (E-856)(3896), Dec. 1989.

Primary Examiner—Olik Chaudhuri
Assistant Examiner—C. Everhart
Attorney, Agent, or Firm—Parkhurst, Wendel & Rossi

[57] ABSTRACT

An air electrode as a component of a solid electrolyte fuel cell. The air electrode is composed of a first layer and a second layer. The first layer has an open porosity of 25% to 57%, pore diameters of 2.5 μm to 12 μm and a resistivity of less than 0.22 Ωcm. The second layer has an open porosity of 8% to 24%, pore diameters of 0.2 μm to 3 μm, and a ratio of the thickness of the second layer to the thickness of the air electrode is 2% to 28%. The sum of the thicknesses of the first and second layers is 0.7 mm to 3.0 mm. The materials of the first and second layers have perovskite structures selected from the group consisting of lanthanum manganate, calcium manganate, lanthanum nickelate, lanthanum cobalate and lanthanum chromate. A solid electrolyte fuel cell includes the air electrode as described above, a solid electrolyte film formed on the surface of the second layer of the air electrode and a fuel electrode film formed on the surface of the solid electrolyte film.

5 Claims, 13 Drawing Sheets

FIG_8

AIR ELECTRODE AND SOLID ELECTROLYTE FUEL CELL HAVING THE SAME

BACKGROUND OF THE INVENTION

1. Field of the Invention

This invention relates to an air electrode for a solid electrolyte fuel cell and more particularly to a solid electrolyte fuel cell which uses the air electrode.

2. Related Art Statement

Recently, fuel cells have been recognized as power generating devices. The fuel cell is a device capable of directly converting chemical energy of fuel to electric energy. As the fuel cell is free from limitation of Carnot's cycle, the cell is a very promising technique owing to its inherently high energy conversion efficiency, wide latitude of fuels to be used (naphtha, natural gas, methanol, coal reformed gas, heavy oil and the like), less public nuisance, and high electric power generating efficiency without being affected by the scale of installations.

Particularly, as the solid electrolyte fuel cell (referred to as "SOFC" hereinafter) operates at high temperatures such as 1,000° C., activity of electrodes is very high. Moreover, the SOFC has low polarization and relatively high output voltage without requiring any catalyst of an expensive noble metal such as platinum so that energy conversion efficiency is much higher than that of other fuel cells. Furthermore, the SOFC is stable and has long service life because all the constituent materials of the SOFC are solid.

In the SOFC, as the constituent components are solid, fuel cells of various structures have been proposed. Moreover, conductive perovskite type oxides of $La(Sr)MnO_3$ group, $La(Sr)CoO_3$ group and the like are expected as promising materials for the air electrode. Particularly, materials of $La(Sr)MnO_3$ group tend to match zirconia solid electrolyte films both in reactivity and thermal expansion coefficient.

However, the materials of the air electrodes described above are higher in electric resistance than materials of the fuel electrodes, which is the reason why output of the electric cells is comparatively low. Moreover, electric current flows along thin air electrode films or air electrode substrates and in parallel therewith, and thus the electric resistance and voltage losses become great as a whole.

In order to avoid this, it is conceivable to make the air electrode as thick as possible to reduce the electric resistance. With a thick air electrode, however, gas diffusion resistance in the air electrode becomes very high, with consequent considerable decrease of oxide agent supply amount to three-phase interfaces where the air electrode, the solid electrolyte film and the oxide agent contact one another. As a result, the output of the unit cell lowers contrary to the expectation.

In order to reduce the gas diffusion resistance in the air electrode to improve the permeability to the oxide agent, it is conceivable to make large the open porosity and pore diameters of the air electrode. However, such a countermeasure will reduce the number and areas of the three-phase interfaces where the air electrode, the solid electrolyte film and the oxide agent contact one another. Moreover, the larger the open porosity, the higher the resistance of the electrode itself so that the output of the single cell lowers likewise.

SUMMARY OF THE INVENTION

It is an object of the invention to provide an air electrode and a solid electrolyte fuel cell having the air electrode, which are able to increase the oxide agent supply amount to three-phase interfaces where the air electrode, the solid electrolyte film and the oxide agent contact one another, and at the same time to increase the number and areas of the three-phase interfaces and lower the electric resistance in the air electrode, thereby increasing the output of the single cell.

In order to accomplish this object, in an air electrode as a component of a solid electrolyte fuel cell, according to the invention the air electrode comprises a first layer and a second layer, the first layer having an open porosity of 25% to 57%, pore diameters of 2.5 $\mu$m to 12 $\mu$m and a resistivity of less than 0.22 $\Omega$cm, the second layer having an open porosity of 8% to 24%, pore diameters of 0.2 $\mu$m to 3 $\mu$m and a ratio of the thickness of the second layer to the thickness of the air electrode being 2% to 28%, and the sum of the thicknesses of the first and second layers being 0.7 mm to 3.0 mm, and materials of the first and second layers have perovskite structures selected from a group consisting of lanthanum manganate, caccium manganate, lanthanum nickelate, lanthanum cobalate and lanthanum chromate.

Moreover, the solid electrolyte fuel cell according to the invention comprises the air electrode described above, a solid electrolyte film formed on the surface of the second layer of the air electrode and a fuel electrode film formed on the surface of the solid electrolyte film.

The invention resides in the discovery that the air electrode is formed by two layers taking partial charge of functions of the air electrode in order that the above object is accomplished. In practice, one layer formed adjacent the solid electrolyte film is the second layer whose open porosity is 8% to 24% and pore diameters are 0.2 $\mu$m to 3 $\mu$m to increase the number and areas of the three-phase interfaces where the second layer, the solid electrolyte film and oxidizing agent contact one another.

Moreover, the ratio of the thickness of the second layer to the air electrode is less than 28% so that the relatively dense second layer restrains gas diffusion resistance from becoming excessively high. Further, as the ratio is more than 2%, it is possible to form a sufficient amount of three-phase interfaces.

Moreover, as the first layer has an open porosity more than 25% and pore diameters more than 2.5 $\mu$m, the gas diffusion resistance of the first layer is very low. Furthermore, as the first layer has an open porosity of less than 57% and pore diameters less than 12 $\mu$m, the air electrode exhibits a high mechanical strength. Moreover, as the first layer has a resistivity of less than 0.22 $\Omega$cm, the electric resistance of the whole air electrode becomes low to restrain electric voltage losses to an insignificant value.

With this arrangement, by combination of the respective components it is possible to elevate the output of the fuel cell to the practically required output value which is more than 0.90 V. Moreover, in order to obtain the output value of more than 0.90 V, the sum of the thicknesses of the first and second layers should be within the range of 0.7 mm to 3.0 mm.

The invention will be more fully understood by referring to the following detailed specification and claims taken in connection with the appended drawings.

DESCRIPTION OF THE PREFERRED EMBODIMENTS

Figure 1:
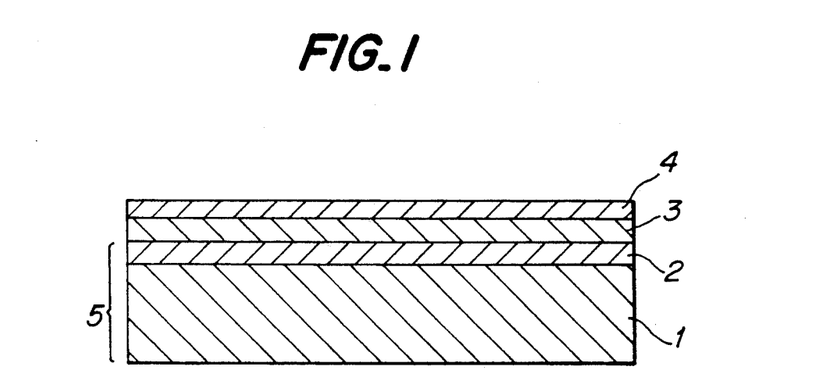
FIG. 1 is a sectional view conceptually illustrating one example of the SOFC according to the invention.

FIG. 1 illustrates in section one example of the SOFC (single cell) according to the invention. The air electrode 5 is of a two-layer structure consisting of a first layer 1 and a second layer 2. A solid electrolyte film 3 is formed on the surface of the second layer 2. A fuel electrode film 4 is further formed on the surface of the solid electrolyte film 3. The shape of the flat plate-shaped SOFC in a plane is, for example, square, rectangular, circular or the like. Moreover, the air electrode according to the invention is also applicable to a so-called tubular SOFC or monolithic SOFC.

Figure 2:
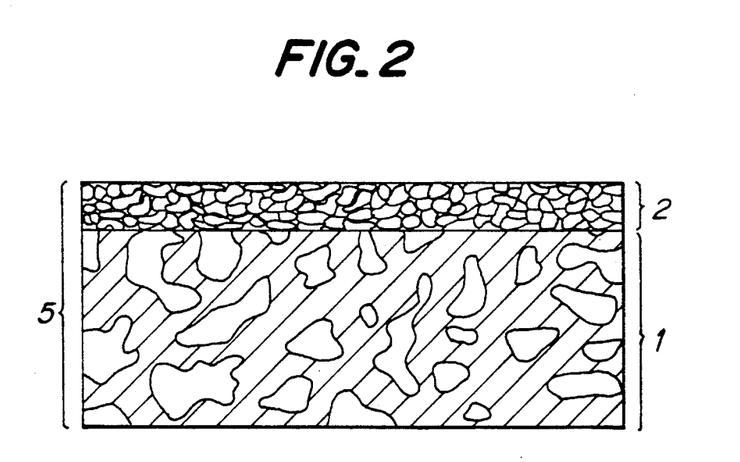
FIG. 2 is a conceptual view illustrating a preferred fine structure of the air electrode according to the invention.

FIG. 2 conceptually illustrates the fine structure of the air electrode 5 shown in FIG. 1. Respective particles sintered together in the first layer 1 are comparatively large, while those in the second layer 2 are comparatively small. The respective particles in the first layer 1 contact one another with wide areas to form as a whole a continuous skeleton. With such a fine structure, the contact surface areas of the particles in the first layer 1 are so large that the resistivity in the first layer 1 is small.

The first and second layers of the air electrode according to the invention have the following parameters determined to exhibit the practically required output voltage in various experiments later described.

The first layer has an open porosity of 25% to 57%, pore diameters of 2.5 $\mu$m to 12 $\mu$m and a resistivity of less than 0.22 $\Omega$cm. The second layer has an open porosity of 8% to 24% and pore diameters of 0.2 $\mu$m to 3 $\mu$m, and a ratio of the thickness of the second layer to the thickness of the air electrode is 2% to 28%. The sum of the thicknesses of the first and second layers is 0.7 mm to 3.0 mm. Materials of the first and second layers have perovskite structures selected from a group consisting of lanthanum manganate, calcium manganate, lanthanum nickelate, lanthanum cobalate and lanthanum chromate.

The perovskite structures are preferably those whose lanthanum atoms or calcium atoms are partially stoichiometrically deficient. Moreover, it is preferable that the metal element included in the perovskite structures is partially substituted by an element selected from the group consisting of strontium, calcium, yttrium, cerium, ytterbium, zinc and barium.

The solid electrolyte fuel cell according to the invention comprises the air electrode as describe above, a solid electrolyte film formed on the surface of the second layer of the air electrode and a fuel electrode film formed on the surface of the solid electrolyte film.

The solid electrolyte film 3 is preferably made of zirconia, and more preferably made of zirconia completely or partially stabilized with yttria, calcia, magnesia or ceria. The fuel electrode film 4 is preferably made of nickel-zirconia cermet, cobalt-zirconia cermet, chromium-zirconia cermet or the like.

EXAMPLE

Flat plate-shaped solid electrolyte fuel cells shown in FIG. 1 were produced which were square in plane and of 20 mm ×20 mm size. Air electrodes 5 were made of $La_{0.9}Sr_{0.1}MnO_3$, whose thickness was 2 mm.

A raw material of $La_{0.9}Sr_{0.1}MnO_3$ was pulverized and its particle sizes were adjusted. Thereafter, the material was added with a pore increasing agent and mixed, and then formed into desired shapes by press-forming and sintered to form first layers 1. On the other hand, after the raw material of $La_{0.9}Sr_{0.1}MnO_3$ was pulverized and its particle sizes were adjusted, the material was coated on each of the first layers 1 by plasma spray coating to form a second layer 2. A solid electrolyte film 3 made of 8 mol yttria-stabilized zirconia (8YSZ) was provided by plasma spray coating on each of the second layers 2. The thickness of the solid electrolyte film 3 was 100 $\mu$m. Platinum paste was coated on the solid electrolyte film 3 by a brush to form a fuel electrode film 4.

The open porosity, pore diameters and resistivity of the first layer and the open porosity, pore diameters and thickness of the first layer were adjusted in a manner as later described. In this example, the fuel gas was hydrogen and the oxidizing gas was air, while operating temperature was 1,000° C.

Experiment 1

Figure 3:
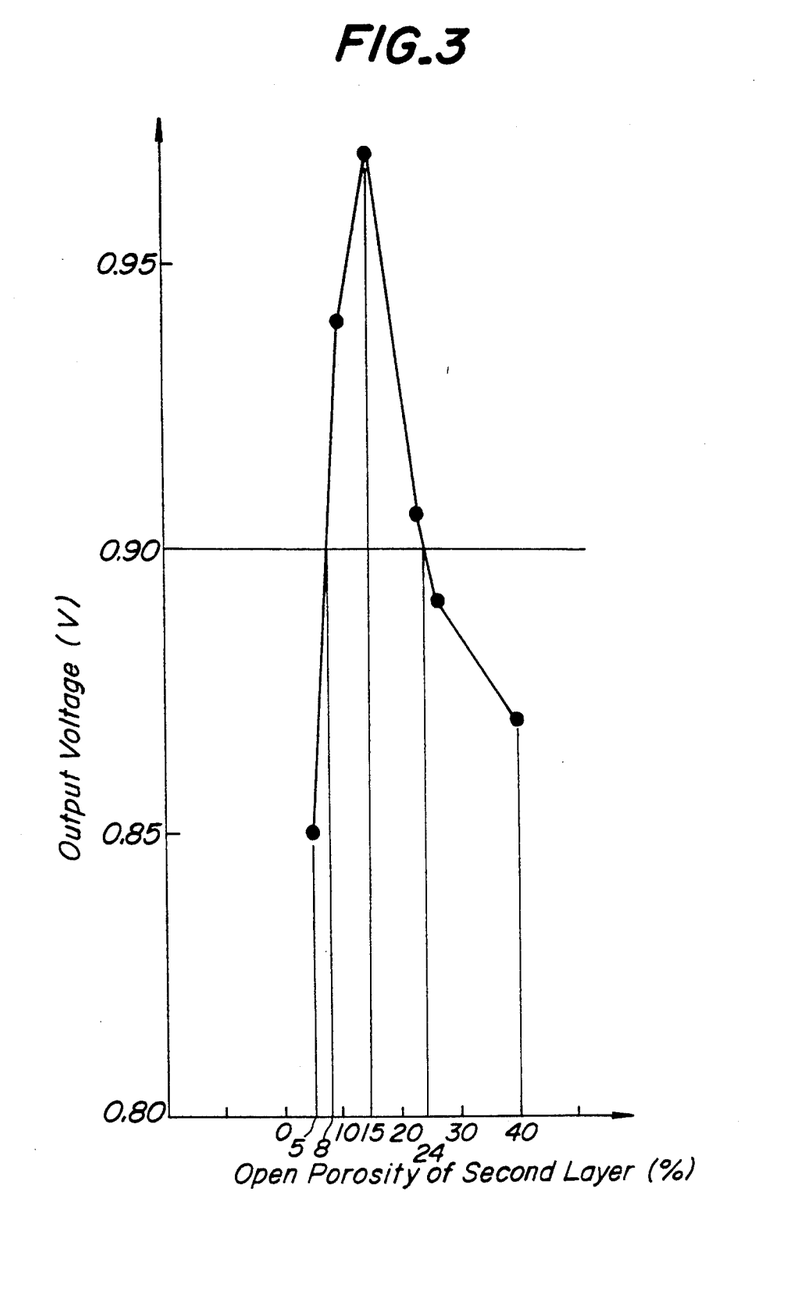
FIG. 3 is a graph illustrating the relation between the output voltage and the open porosity of the second layer in an experiment for determining the feature according to the invention.

The open porosity of the second layer was changed within a range of 5% to 40% to search the open porosity range of the second layer where the output voltage was more than 0.90 V as shown in FIG. 3. In this case, the first layer had an open porosity of 40% and pore diameters of 8 μm and the ratio of the thickness of the first layer to the total thickness of the air electrode was 95%, while the second layer had pore diameters of 1 μm and the ratio of the thickness of the second layer to the total thickness of the air electrode was 5%. It had been found that the output voltages were more than 0.90 V within the range of 8% to 24% of the open porosity of the second layer, and the maximum output voltage was 0.97 V at the 15% open porosity of the second layer.

The output voltages of the single cell were measured at current density of 250 mA/cm². This measurement condition of the output voltage was used likewise in the Experiments 2 to 6 later described.

Figure 4:
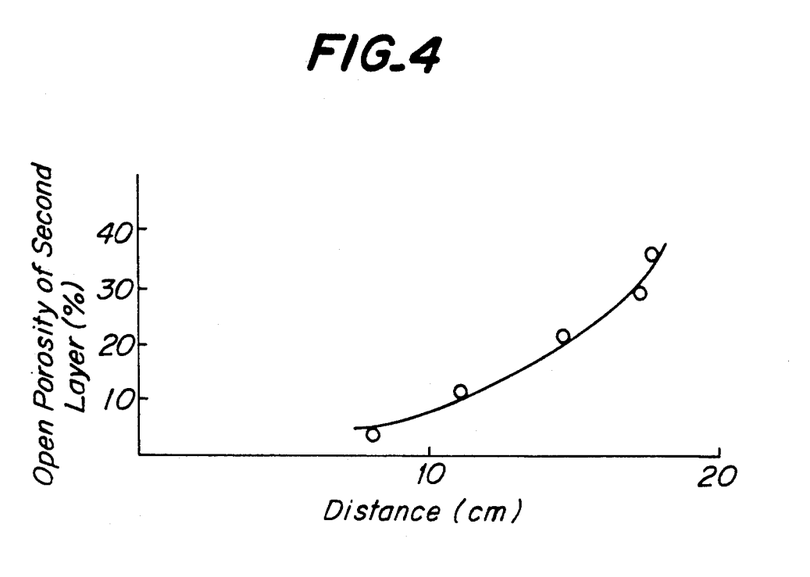
FIG. 4 is a graph illustrating the relation between the open porosity of the second layer and the distance from a plasma spray gun to the surface of the first layer in the experiment.

The open porosity of the second layer was changed in the following manner. The second layer was formed by plasma spray coating described above. By changing distances (cm) between the plasma spray gun and the surface of the first layer in the plasma spray coating, the open porosity of the second layer was changed. The open porosit was measured by image analysis with a scanning electron microscope (SEM). In plasma spray coating, the output of the plasma spray was 35 KW and flow rates of gases were 10 l/min for hydrogen and 35 l/min for argon. Granulated particles of an average diameter of 40 μm were used as particles for the plasma spray coating.

Experiment 2

Figure 5:
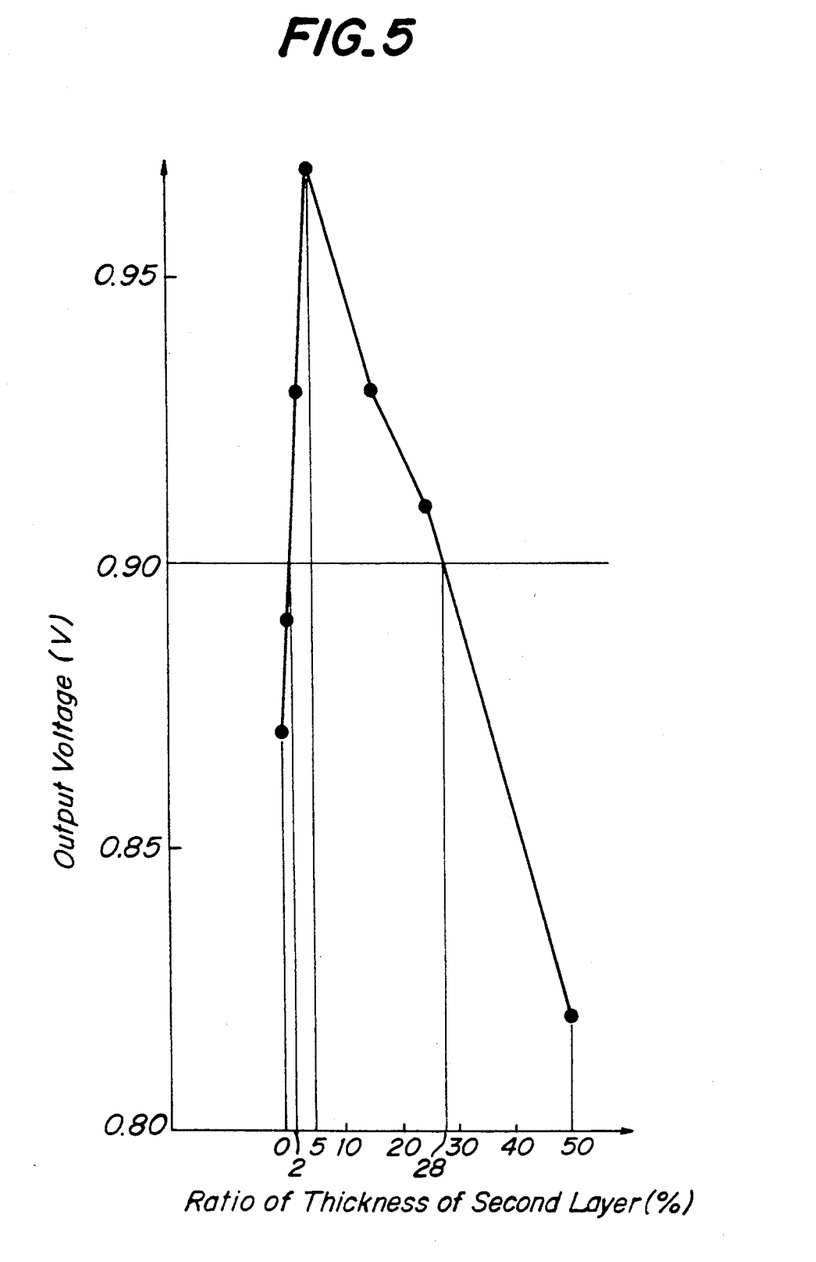
FIG. 5 is a graph illustrating the relation between the output voltage and the ratio of the thickness of the second layer to the total thickness of the air electrode in an experiment for determining the feature according to the invention.

The ratio of the thickness of the second layer to the thickness of the air electrode was changed within a range of 0% to 50% to search the open porosity range of the second layer where the output voltage was more than 0.90 V. In this case, the first layer had an open porosity of 40% and pore diameters of 8 μm, while the second layer had an open porosity of 15% and pore diameters of 1 μm. It had been found that the output voltages were more than 0.90 V within 2% to 28% ratio of the thickness of the second layer to the thickness of the air electrode and the maximum output voltage was 0.97 V at the 5% ratio.

Figure 6:
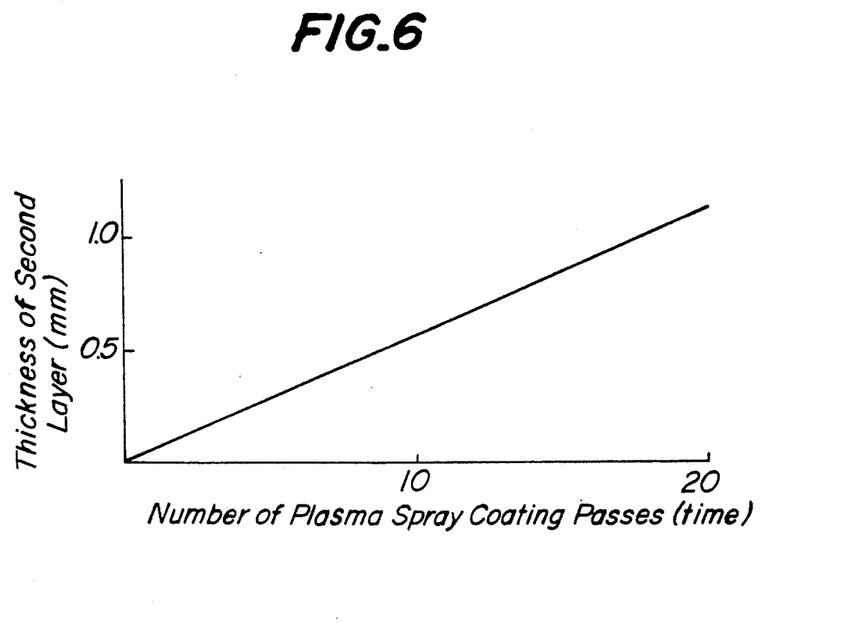
FIG. 6 is a graph illustrating the relation between the thickness of the second layer and the number of plasma spray passes in the experiment.

The ratio of the thickness of the second layer was changed by varying the number of plasma spray coating passes to change the thickness of the second layer as shown in FIG. 6. At the same time, the first layer was ground to change its thickness so as to adjust the total thickness of the air electrode to be 2 mm. In plasma spray coating, the output of the plasma spray was 35 KW and flow rates of gases were 10 l/mn for hydrogen and 35 l/min for argon. Granulated particles for the plasma spray coating had an average diameter of 40 μm. The distance between the plasma spray gun and the surface of the first layer was 15 cm.

Experiment 3

Figure 7:
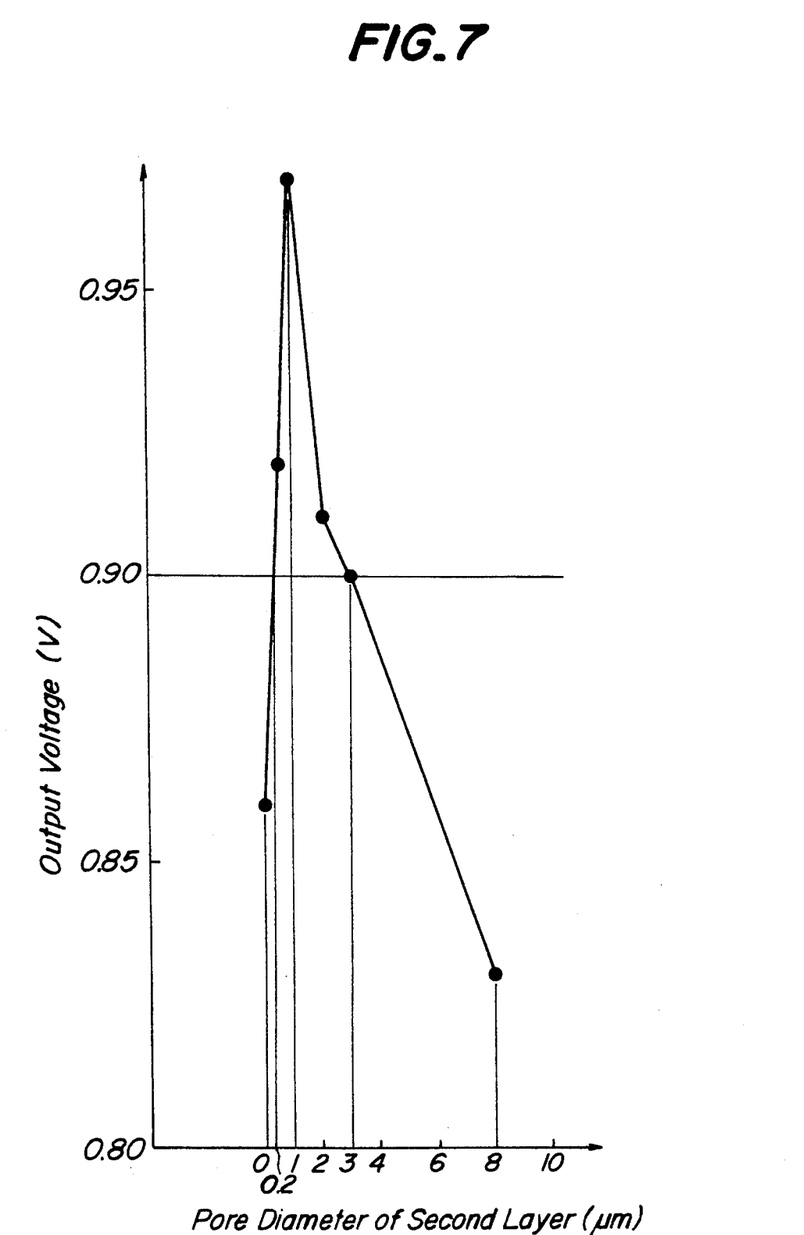
FIG. 7 is a graph illustrating the relation between the output voltage and pore diameters of the second layer in an experiment for determining the feature according to the invention.

The pore diameters of the second layer were changed within a range of 0 μm to 8 μm to search the pore diameter range of the second layer where the output voltage was more than 0.90 V as shown in FIG. 7. In this case, the first layer had an open porosity of 40% and pore diameters of 8 μm, and the ratio of the thickness of the first layer to the total thickness of the air electrode was 95%, while the second layer had an open porosity of 15%, and the ratio of the thickness of the second layer to the total thickness of the air electrode was 5%. It had been found that the output voltages were more than 0.90 V within 0.2 μm to 3 μm of the pore diameters of the second layer, and the maximum output voltage was 0.97 V at 1 μm pore diameters of the second layer.

Figure 8:
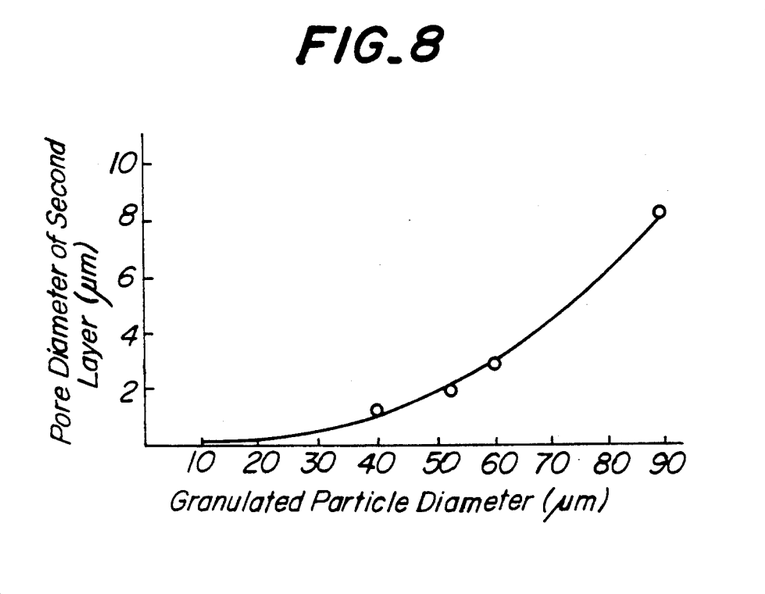
FIG. 8 is a graph illustrating the relation between the pore diameters of the second layer and granulated particle diameters of raw material for plasma spray in the experiment.

The pore diameter of the second layer was changed by varying granulated particle diameters of raw material for plasma spray coating as shown in FIG. 8. In plasma spray coating, the output of the plasma spray was 35 KW and flow rates of gases were 10 l/min for hydrogen and 35 l/min for argon. The distance between the plasma spray gun and the surface of the first layer was 15 cm.

Experiment 4

Figure 9:
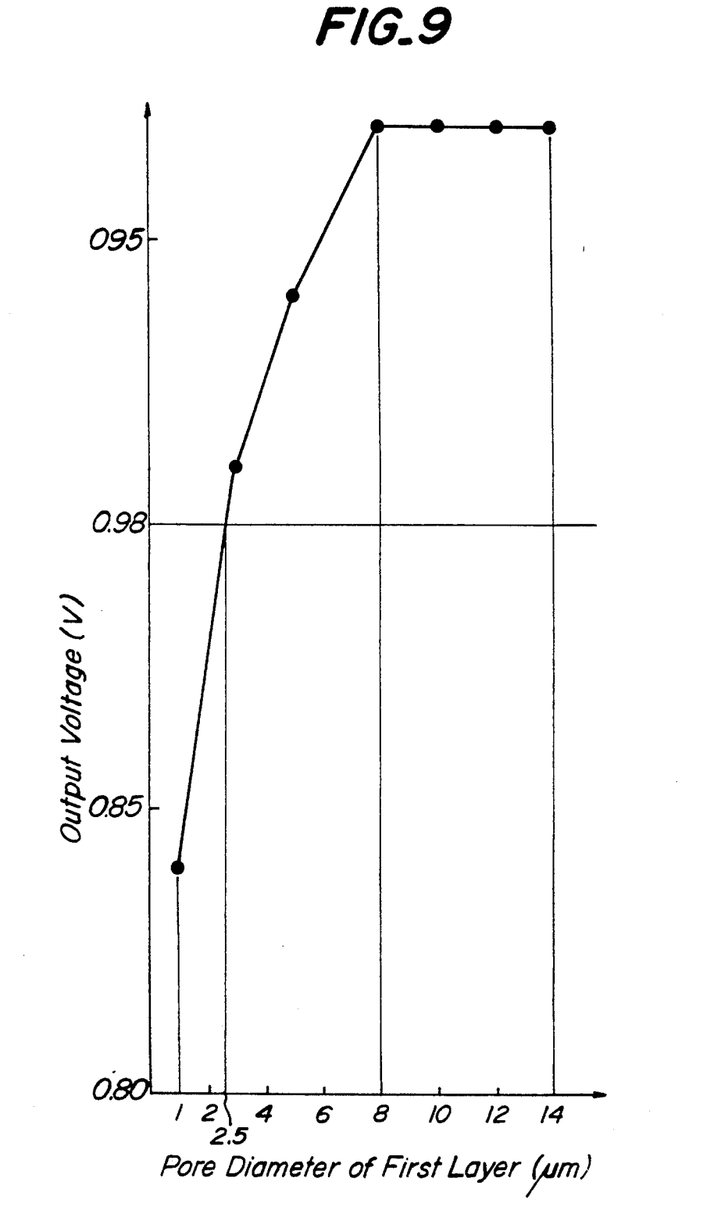
FIG. 9 is a graph illustrating the relation between the output voltage and pore diameters of the first layer in an experiment for determining the feature according to the invention.

The pore diameters of the first layer were changed within a range of 1 μm to 14 μm to search the pore diameter range of the first layer where the output voltage was more than 0.90 V as shown in FIG. 9. In this case, the first layer had an open porosity of 40%, and the ratio of the thickness of the first layer to the total thickness of the air electrode was 95%, while the second layer had an open porosity of 15% and pore diameters of 1 μm, and the ratio of the thickness of the second layer to the total thickness of the air electrode was 5%. It had been found that the output voltages were more than 0.90 V within the range of the pore diameters of the first layer more than 2.5 μm, and the maximum output voltage was 0.97 V when the pore diameters of the first layer are more than 8 μm. Within the range of the pore diameters of the first layer more than 12 μm, the mechanical strength of the first layer was rapidly lowered.

Figure 10:
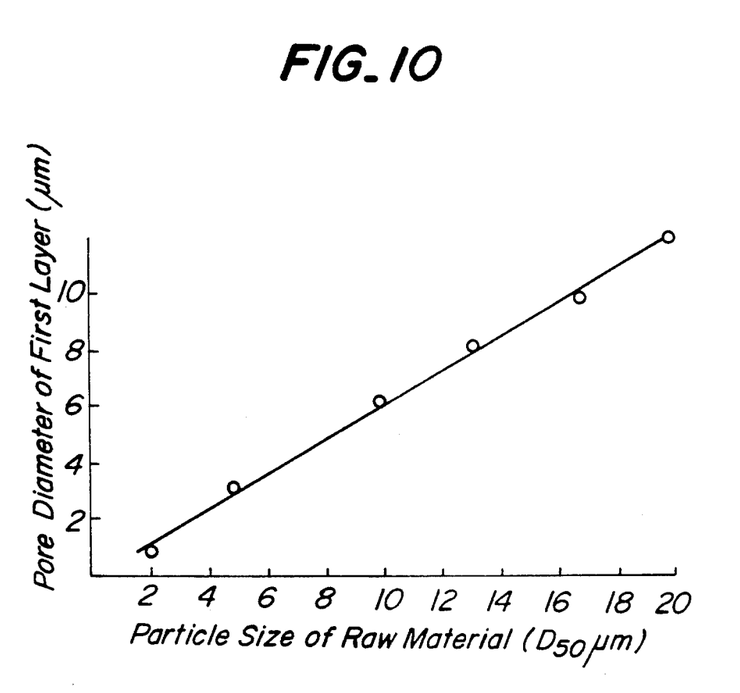
FIG. 10 is a graph illustrating the relation between the pore diameters of the first layer and particle size of raw material for the first layer in the experiment.

The pore diameters of the first layer were adjusted by changing the particle size of the raw material of the first layer. In more detail, the raw material was pulverized to adjust the grain sizes and a pore increasing agent (acrylic powder) was added. The material, to which the pore increasing agent was added, was formed into a desired shape by press-forming, and then fired. As shown in FIG. 10, pore diameters of the first layers were changed by the particle sizes of the pulverized raw material. In this case, the firing temperature was changed within the range later described in order to maintain the open porosity of the first layer at 40%. The pore increasing agent was 4 weight % and the firing temperatures were 1,250 ° C. to 1,680° C.

Experiment 5

Figure 11:
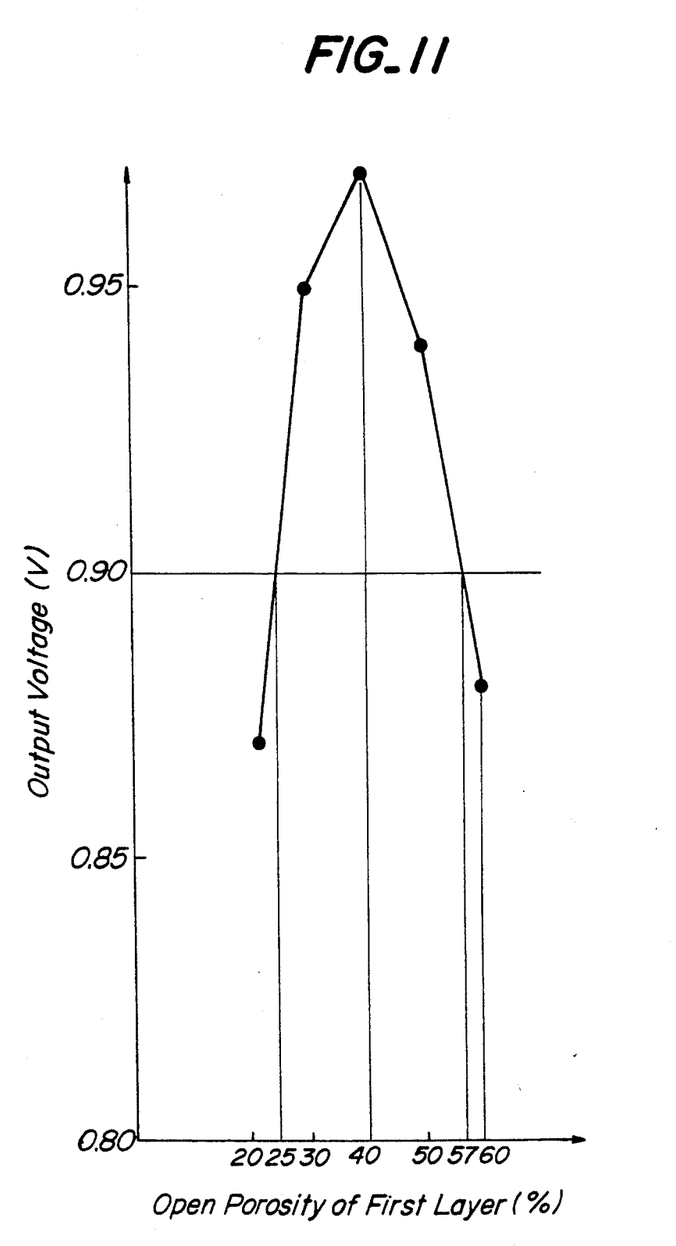
FIG. 11 is a graph illustrating the relation between the output voltage and pore diameters of the first layer in an experiment for determining the feature according to the invention.

The open porosity of the first layer was changed within a range of 25 μm to 57 μm to search the open porosity range of the first layer where the output voltage was more than 0.90 V as shown in FIG. 11. In this case, the first layer had pore diameters of 8 μm, and the ratio of the thickness of the first layer to the total thickness of the air electrode was 95%, while the second layer had an open porosity of 15% and pore diameters of 1 μm, and the ratio of the thickness of the second layer to the total thickness of the air electrode was 5%. It had been found that the output voltages were more than 0.90 V within the range of open porosity of 25% to 57%, and the maximum output voltage was 0.9 V at 40% open porosity of the first layer.

Figure 12:
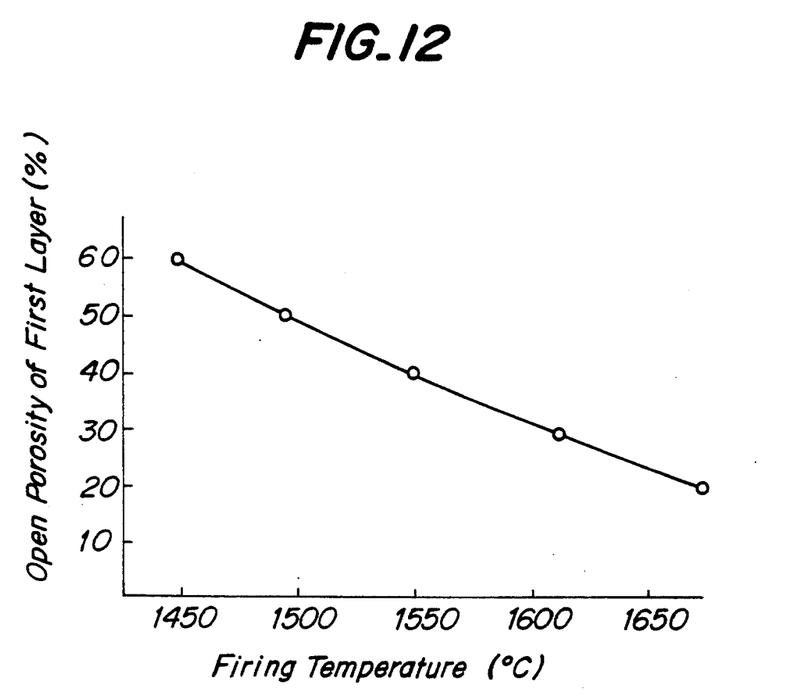
FIG. 12 is a graph illustrating the relation between the open porosity of the first layer and firing temperature of the first layer in the experiment.

In order to change the open porosity of the first layer, the formed bodies were fired at various temperatures as shown in FIG. 12. The pore increasing agent was 4 weight % and granulated particle diameters before the press-forming were 13 μm.

Experiment 6

Figure 13:
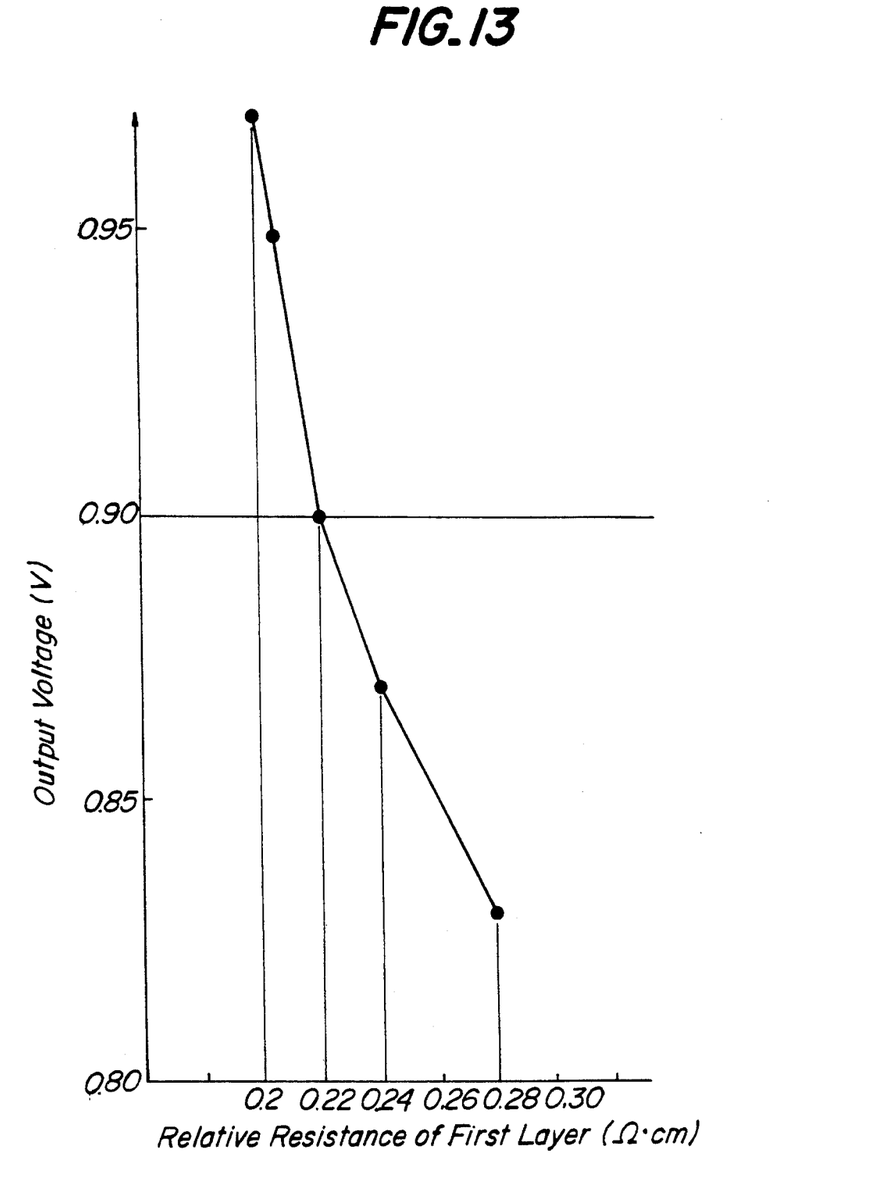
FIG. 13 is a graph illustrating the relation between the output voltage and the resistivity of the first layer in an experiment for determining the feature according to the invention.

The resistivity of the first layer was changed within a range of 0.2 Ωcm to 0.28 Ωcm to search the resistivity of the first layer where the output voltage was more than 0.9 V as shown in FIG. 13. In this case, the first layer had an open porosity of 40% and pore diameters of 8 μm, and the ratio of the thickness of the first layer to the total thickness of the air electrode was 95%, while the second layer had an open porosity of 15% and pore diameters of 1 μm, and the ratio of the thickness of the second layer to the total thickness of the air electrode was 5%. It had been found that the output voltage was more than 0.90 V within the range of the resistivity of less than 0.22 Ωcm.

Figure 14:
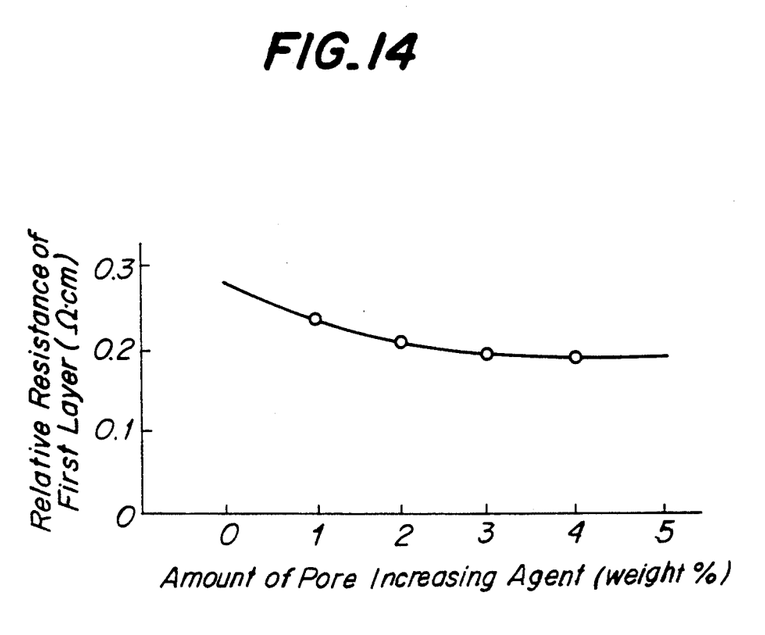
FIG. 14 is a graph illustrating the relation between the amount of the pore increasing agent and the resistivity of the first layer in the experiment. 1 . . . first layer 2 . . . second layer 3 . . . solid electrolyte film 4 . . . fuel electrode film 5 . . . air electrode film

The resistivity of the first layer was varied by changing amounts of the pore increasing agent (acrylic powder) as shown in FIG. 14. By changing the amounts of the pore increasing agent, the bulk density of the first layer was changed and the firing temperature was changed within 1,200° C. to 1,680° C. However, the open porosity of the first layer was fixed at 40%. By changing the firing temperature, growing degrees of connections (necks) between adjacent particles were changed to vary contact areas between the adjacent particles, with the result that the resistivity of the first layer was changed correspondingly thereto.

In this Experiment, the pore increasing agent was added to the raw material of the first layer in order to relatively enlarge the open porosity and the pore diameters of the first layer. However, in order to adjust the open porosity and pore diameters of the fired first layer, a plate-shaped body formed by press-forming may be worked to form apertures before firing or after firing.

Experiment 7

The experiment was effected to search the relation between the sum of thicknesses of the first and second layers and output of the single cell. The first layer had an open porosity of 40% and pore diameters of 8 μm, and the ratio of the thickness of the first layer to the total thickness of the air electrode was 95%, while the second layer had an open porosity of 15% and pore diameters of 1 μm, and the ratio of the second layer to the total thickness of the air electrode was 5%. The ratio of the thickness of the second layer was varied by changing the number of the plasma spray coating passes. At the same time, the thickness of the first layer was changed by grinding it to adjust the ratio between the thicknesses of the first and second layers to be constant.

The sum of the thicknesses of the first and second layers was changed as follows and the output voltages of the unit cell were measured.

| Sum of thicknesses of first and second layers (mm) | Output voltage (V) |
|---|---|
| 0.7 | 0.90 |
| 1.0 | 0.92 |
| 1.5 | 0.95 |
| 2.0 | 0.97 |
| 2.5 | 0.93 |
| 3.0 | 0.90 |
| 0.5 | 0.87 |
| 5.0 | 0.83 |

As can be seen from the results, the practically required output voltage of more than 0.90 V could be obtained within the range 0.7 mm to 3.0 mm of the sum of thicknesses of the first and second layers.

In the air electrode and the solid electrolyte fuel cell having the air electrode according to the invention, it is possible to increase oxide agent supply amount to three-phase interfaces where the air electrode, the solid electrolyte film and the oxide agent contact one another, and at the same time to increase the number and areas of the three-phase interfaces and lower the electric resistance in the air electrode, thereby increasing the output of the fuel cell as described above.

While the invention has been particularly shown and described with reference to preferred embodiments thereof, it will be understood by those skilled in the art that the foregoing and other changes in form and details can be made therein without departing from the spirit and scope of the invention.

We claim:

1. An air electrode as a component of a solid electrolyte fuel cell, said air electrode comprising:
   a first layer having an open porosity of 25% to 57%, pore diameters of 2.5 μm to 12 μm and a resistivity of less than 0.22 Ωcm; and
   a second layer formed on said first layer and having an open porosity of 8% to 24% and pore diameters of 0.2 μm to 3 μm;
   wherein a ratio of the thickness of the second layer to the thickness of the air electrode is 2% to 28%, a sum of the thickness of the first and second layers is 0.7 mm to 3.0 mm, and materials of the first and second layers have perovskite structures selected from the group consisting of lanthanum manganate, calcium manganate, lanthanum nickelate, lanthanum cobalate and lanthanum chromate.

2. The air electrode of claim 1, wherein said perovskite structures have an insufficient number of lanthanum atoms to provide a stoichiometric composition.

3. The air electrode of claim 1, wherein said perovskite structures have an insufficient number of calcium atoms to provide a stoichiometric composition.

4. The air electrode of claim 1, wherein the metal element included in the perovskite structures is partially substituted by an element selected from the group consisting of strontium, calcium, yttrium, cerium, ytterbium, zinc and barium.

5. A solid electrolyte fuel cell comprising the air electrode of claim 1, a solid electrolyte film formed on a surface of the second layer of the air electrode, and a fuel electrode film formed on a surface of the solid electrolyte film.

* * * * *